(12) United States Patent
Elwood et al.

(10) Patent No.: US 6,918,312 B2
(45) Date of Patent: Jul. 19, 2005

(54) VALIDATION DEVICE AND METHOD

(75) Inventors: Bryan M. Elwood, Chandler, NC (US); Charles G. Butts, Weaverville, NC (US); Walter Jeff Tipton, Asheville, NC (US)

(73) Assignee: Kendro Laboratory Products LP, Ashville, NC (US)

( * ) Notice: Subject to any disclaimer, the term of this patent is extended or adjusted under 35 U.S.C. 154(b) by 141 days.

(21) Appl. No.: 10/156,801

(22) Filed: May 30, 2002

(65) Prior Publication Data

US 2003/0221486 A1 Dec. 4, 2003

(51) Int. Cl.⁷ ............................................. G01M 19/00
(52) U.S. Cl. ..................... 73/866.5; 73/865.8
(58) Field of Search ........................ 73/866.5, 865.8, 73/760, 781, 783, 774, 775, 776, 777, 778, 779, 780, 29.01; 374/141, 142, 208

(56) References Cited

U.S. PATENT DOCUMENTS

| | | | | |
|---|---|---|---|---|
| 3,757,207 A | * | 9/1973 | Hire | 324/417 |
| 4,107,660 A | * | 8/1978 | Chleboun | 340/566 |
| 4,942,700 A | | 7/1990 | Hoberman | |
| 5,583,481 A | * | 12/1996 | Gardner | 340/442 |
| 5,739,443 A | * | 4/1998 | Saunders | 73/866.5 |
| 5,814,771 A | * | 9/1998 | Oakes et al. | 177/136 |
| 6,154,658 A | * | 11/2000 | Caci | 455/466 |
| 6,200,023 B1 | * | 3/2001 | Tay et al. | 374/161 |

* cited by examiner

Primary Examiner—Robert Raevis
(74) Attorney, Agent, or Firm—Baker & Hostetler LLP; Sean A. Pryor

(57) ABSTRACT

A testing apparatus is disclosed that includes an expandable mechanical structure, and logging devices that are coupled to the mechanical structure and serially networked together. The testing apparatus of the present invention is utilized to accommodate storage units, such as refrigerators, freezers and incubators, of various sizes.

3 Claims, 4 Drawing Sheets

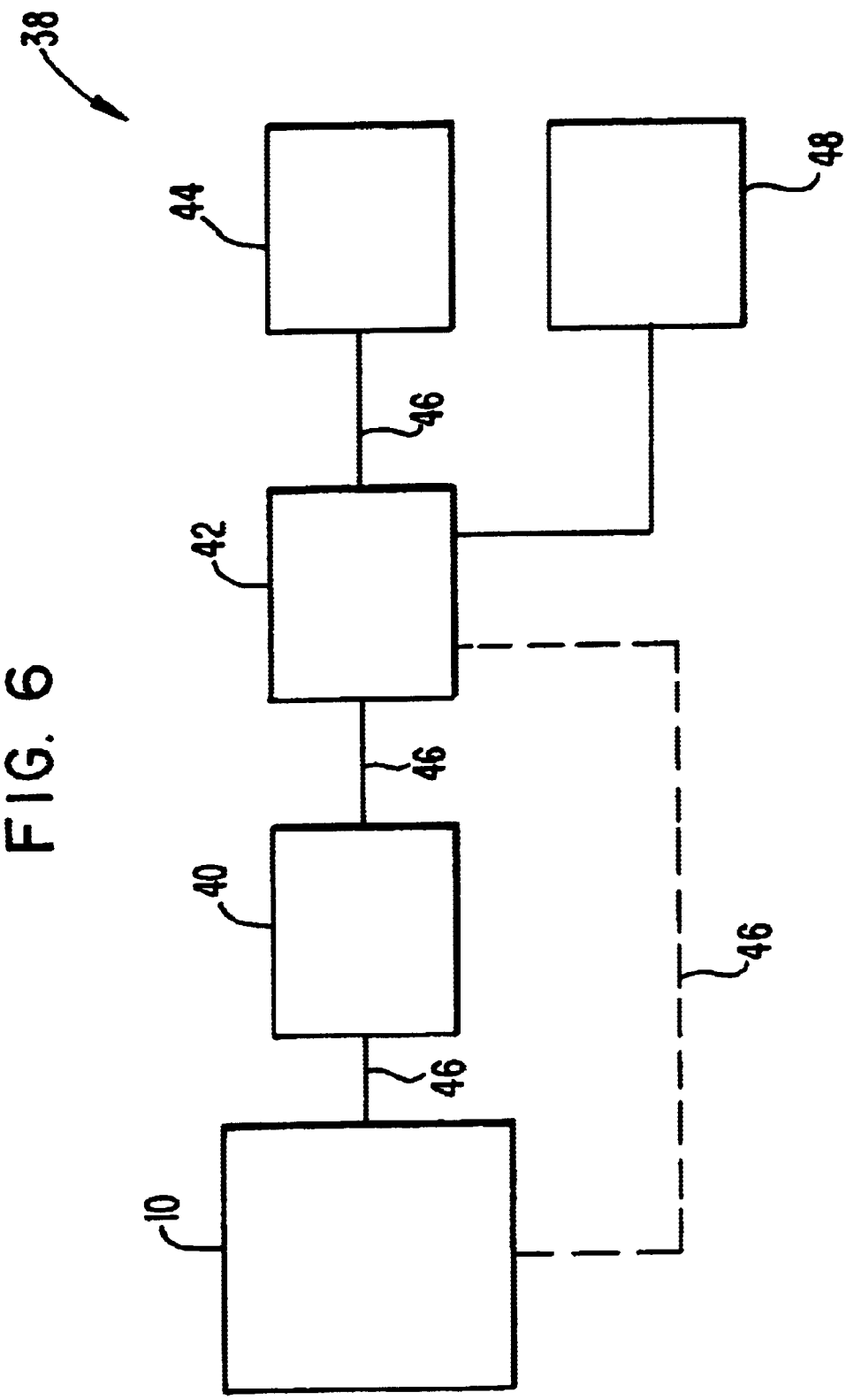

VALIDATION DEVICE AND METHOD

FIELD OF THE INVENTION

The present invention relates generally to devices and methods for measuring environmental conditions. More specifically, the present invention is directed to methods and devices for measuring the temperature at various locations within a storage unit.

BACKGROUND OF THE INVENTION

It is critical in certain industries that goods be stored within specific temperature ranges to maintain the integrity of the goods. For example, goods utilized in the medical and food industries are often required to be maintained according to standards that are established in the respective industries to ensure that the quality of the goods is maintained. Accordingly, the temperature distribution within a particular storage unit, such as a refrigerator, a freezer, or an incubator, is evaluated by a purchaser before it is utilized, and during the course of its lifetime to validate that the storage unit in use is performing in accordance with the established standards.

Manufacturers, when provided with information from a purchaser specifying how a storage unit will be utilized, will design the storage unit to meet the purchaser's requirements and will test the storage unit before shipping it to the purchaser to verify that the storage unit performs as expected. The purchaser, upon receipt of the storage unit typically will also test the temperature distribution within the storage unit to ensure that the storage unit meets the specifications. Notwithstanding these tests by the manufacturer, purchasers frequently find that the storage unit does not perform as indicated by the manufacturer.

The difference between the manufacturer's test data and the purchaser's test data is often attributed to the differences between the testing equipment of the manufacturer and the testing equipment of the purchaser. The differences between the test equipment may be attributed to the differences between the needs of the manufacturer and the needs of the purchaser. A manufacturer may have test equipment that is designed to test storage units of various sizes, while a purchaser may have test equipment that is designed to test a storage unit of a particular size.

Conventional equipment, utilized by both manufacturers and purchasers for evaluating the temperature distribution within a storage unit, includes a processing device from which sensors attached to conductive wires extend. An opening or port is provided to allow the conductive wires and sensors into the storage unit for measuring the temperature within the storage unit. There may be discrepancies between the test data of the manufacturer and the test data of the purchaser, if, for example, any one or more of the following factors differ between the two sets of test equipment: the number of sensors; the number and type of conductive wires thermal weighting of the sensors; and the size of the port or opening created in the storage unit.

The sensors and wires generate electric fields that contribute heat to the environment within the storage device. Accordingly, the temperature within a storage unit may vary according to the number of sensors and wires utilized. Further, the amount of heat generated by a particular type of wire may vary according to how well the wire is insulated, i.e., how well the insulating material is preventing heat generated from the conductive wires from penetrating into the storage unit.

Air from outside of the storage unit entering through the port or opening where the wires are brought into the storage unit can affect the temperature inside of the storage unit. The more the wiring fills the opening, the less outside air will enter the storage unit and affect the temperature distribution within the storage unit. Thus, the amount of outside air that is able to enter the storage unit will depend on the number of wires utilized and/or the size of the wires utilized. Accordingly, temperature measurements by the manufacturer may differ from the temperature measurements of the purchaser if each utilizes a different number of wires to perform temperature measurements.

Thus, in order to eliminate discrepancies between the manufacturer's test data and the purchaser's test data, it would be desirable to have a standard method and device for evaluating the temperature within a storage unit that can be easily duplicated and utilized by the manufacturer and the purchaser to render consistent test data.

It would also be desirable to provide a method and device for evaluating the temperature within a storage unit that can be utilized to test storage units of various sizes.

SUMMARY OF THE INVENTION

In one aspect of the invention, a testing apparatus is provided that includes an expandable mechanical structure and logging devices, wherein the logging devices are coupled to the mechanical structure, and wherein the logging devices are serially connected.

In another aspect of the invention, a testing apparatus is provided that includes a means for interconnecting linking members into an expandable structure, and a means for serially networking the logging devices, wherein the logging devices are coupled to the linking members.

In yet another aspect of the present invention, a testing apparatus is provided that includes a method for testing environmental conditions within a storage unit, including expanding a mechanical structure within the storage unit, and recording environmental conditions within the storage unit.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6 is a block diagram of a testing apparatus in accordance with the present invention.

DETAILED DESCRIPTION OF PREFERRED EMBODIMENTS

Figure 1:
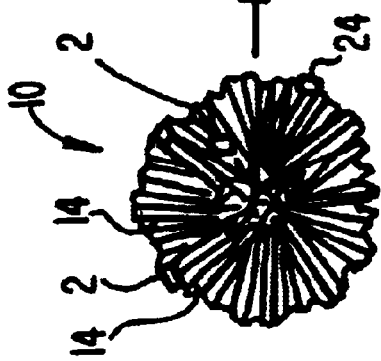
FIG. 1 is a perspective view of a testing apparatus in accordance with the present invention.
Figure 2:
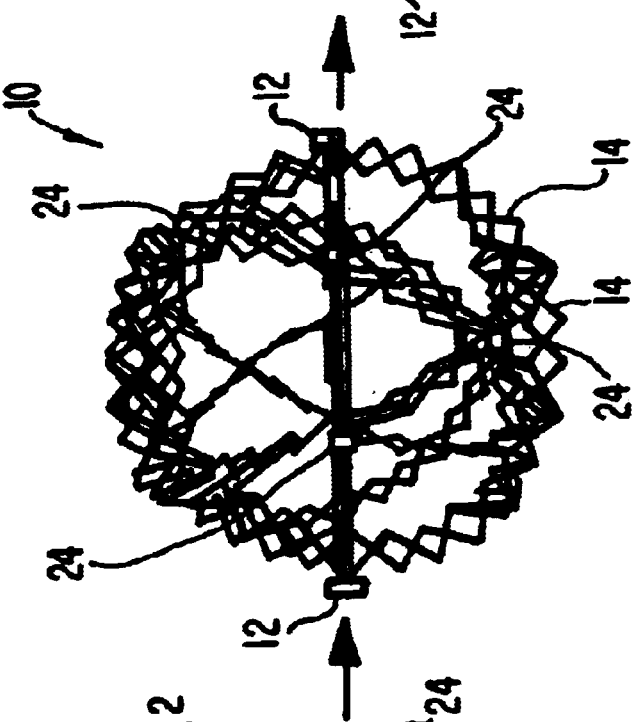
FIG. 2 is a perspective view of the testing apparatus of FIG. 1 in an expanded state.
Figure 3:
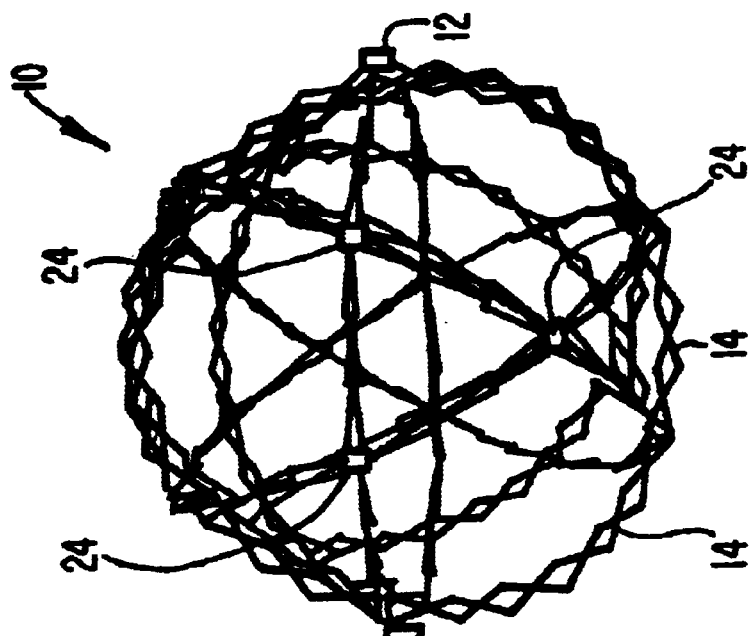
FIG. 3 is a perspective view of the testing apparatus of FIG. 2 in a further expanded state.

Referring now to the figures, wherein like reference numerals indicate like elements, a testing apparatus 10 in accordance with the present invention is shown in FIG. 1. In exemplary embodiments of the present invention, the testing apparatus 10 is expandable to one or more expanded states. Shown in FIG. 2, the testing apparatus 10 is in a first expanded state. One or more locking mechanisms 12, for example, screw mechanisms, are utilized to lock the testing apparatus 10 into the expanded state. Shown in FIG. 3, the testing apparatus 10 is in a second expanded state. In an exemplary embodiment of the present invention, the testing apparatus 10 is expandable from nine inches (22.86 cm) to thirty inches (76.2 cm).

Because of its expandable nature, the testing apparatus 10 is adjustable to fit within storage units of various sizes. The flexible nature of the testing apparatus 10 also eliminates the need for a manufacturer and/or a purchaser of multiple storage units to have a testing device for each of its storage units. Accordingly, the utilization of a testing apparatus 10 in accordance with the present invention will provide a cost savings to the manufacturer and/or the purchaser of multiple storage units.

Figure 4:
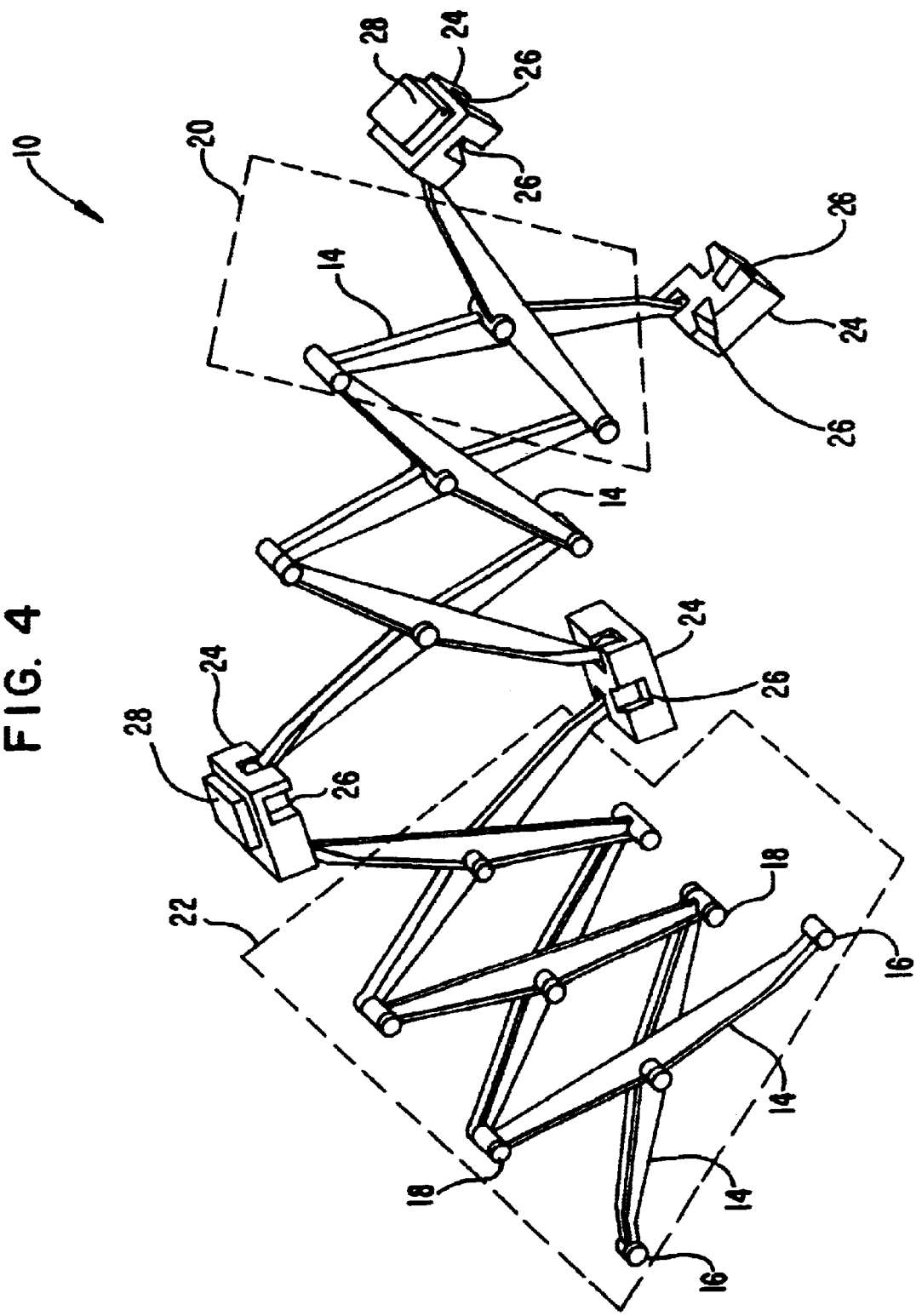
FIG. 4 is a perspective view of a section of the testing apparatus of FIG. 1.

As shown in FIG. 4 the testing apparatus 10 is constructed from linking members 14 that are pivotally connected together. In an exemplary embodiment of the present invention, the linking members 14 have receptacles 16 and/or protrusions 18 that allow the linking members 14 to be coupled in scissor-like pairs of linking members 20. In an exemplary embodiment of the present invention, at least two scissor-like pairs of linking members 20 are connected to form a series of scissor-like pairs of linking members 22. The series of scissor-like pairs of linking members 22 are assembled with each other, utilizing nodes 24, to form the testing apparatus 10. The nodes 24 have receptacles 26 that allow, for example, up to four series of scissor-like linking members 22 to be coupled to one node 24.

In an exemplary embodiment of the present invention, the linking members 14 are assembled in the shape of a sphere, for example, a Hoberman sphere, as described in U.S. Pat. No. 4,942,700, incorporated herein by reference. It should be understood that the testing apparatus 10 of the present invention may be configured by any number of linking members 14 and any number of nodes 24 into different geometric shapes.

Logging devices 28 are removably coupled to the nodes 24 of the testing apparatus 10. In another exemplary embodiment of the present invention, the logging devices 28 are fixed to the nodes 24.

In yet another exemplary embodiment of the present invention, the logging devices 28 are integrated with the nodes 24. The logging devices 28 are utilized to sense environmental conditions, for example, the temperature, the humidity, and/or the presence of gases, within a closed environment or an open environment.

Figure 5:
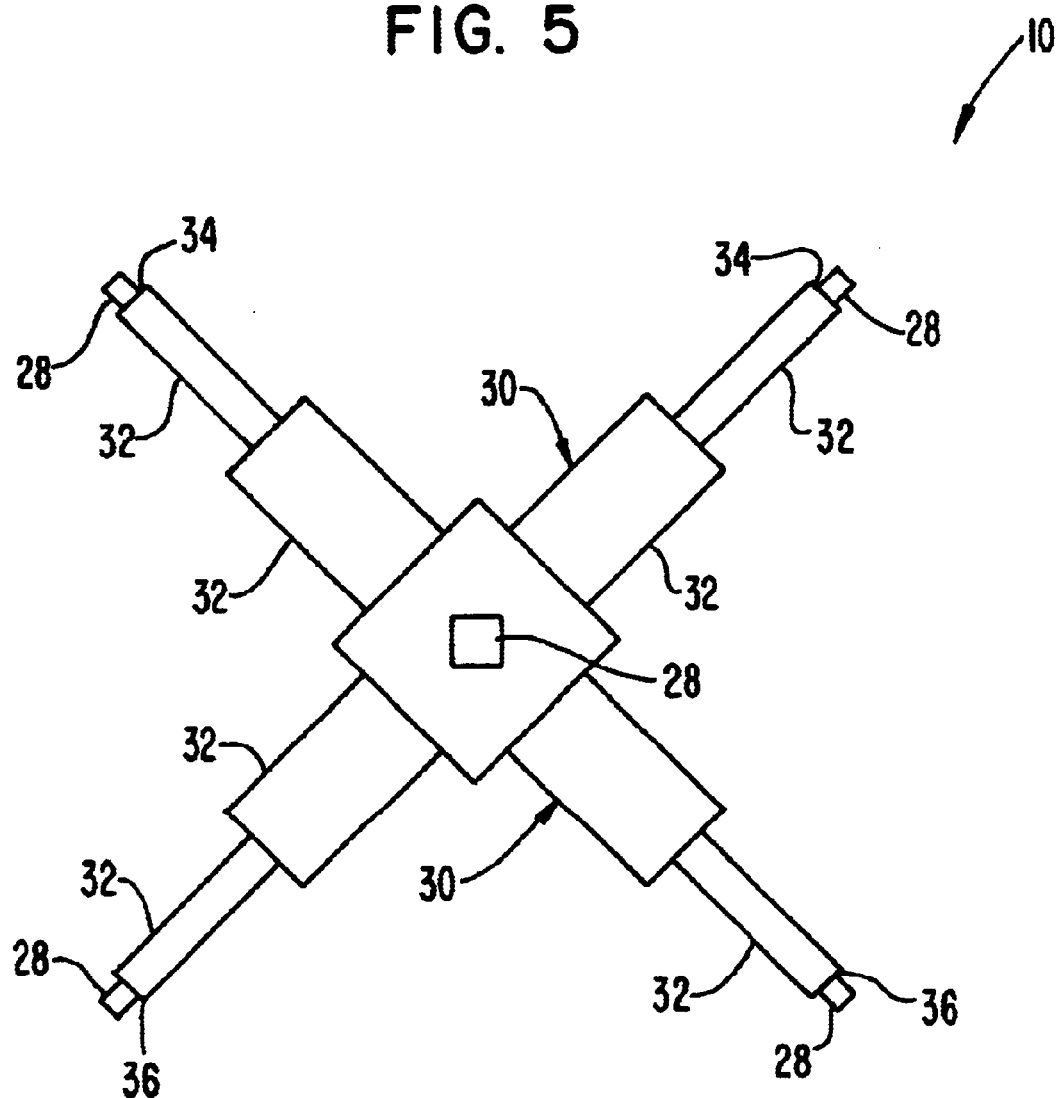
FIG. 5 is a front plan view of a testing apparatus in accordance with the present invention.

In an exemplary embodiment of the present invention shown in FIG. 5, the testing apparatus 10 is made from telescopic members 30. In an exemplary embodiment of the present invention, there are two telescopic members 30 that are made from an outer telescopic component 32 and an inner telescopic component 33, which are linking members, that can be retracted into the telescopic members 30 and withdrawn from the telescopic members 30, such that the testing apparatus 10, when made from telescopic members, is expandable. In an alternate embodiment of the present invention, at least one of the telescopic members is fixed, i.e., non-retractable. It should be understood by one of ordinary skill in the art that the number of telescopic members 30 and telescopic components 32 may vary.

It is desirable to ensure that the temperature within, for example, a storage unit 31 is distributed uniformly or near uniformly throughout the storage unit 31. Accordingly, in an exemplary embodiment of the present invention, logging devices 28 are coupled to top ends 34 and bottom ends 36 of the inner telescopic component 33 and to the center of the testing apparatus 10. Accordingly, the storage unit 31 can be evaluated to ascertain, for example, whether the temperature at each of the corners of the storage unit 31 is the same as the temperature at the center of the testing apparatus.

The logging devices 28 of the testing apparatus 10 are serially networked together and each logging device 28 has a unique serial address. The logging devices 28 may be networked together via accordion style wiring. Accordingly, only one conductive connection, from one of the logging devices 28, is needed to connect the logging devices 28 to other devices, such as a display or a data storage device. Accordingly, only one conductive connection 35 extends through a port 37 of the storage unit 31.

In an alternative exemplary embodiment of the present invention, the logging devices 28 each have conductive portions and the linking members are made from a conductive material. Accordingly, the coupling of the linking members 14, 30 to each other to form a testing apparatus 10 in accordance with the present invention also forms an electrical network. When the conductive portion of a logging device 28 is coupled to the linking members 14, 30, the logging devices are connected into the electrical network formed by the linking members 14, 30.

Shown in FIG. 6, a testing system 38 is provided that includes the testing apparatus 10, a read or read/write device 40, a processor 42, a display 44 conductive connections 46, and a data storage device 48. During operation of the testing system 38, when the testing apparatus 10 is placed in, for example, a storage unit, the logging devices 28 record the data corresponding to the environmental conditions within the storage unit, such as temperature, humidity, and/or the presence of gases, and time and/or date stamps when the test data is recorded. The recorded data is downloaded from the testing apparatus 10, upon removal of the testing apparatus 10 from the storage unit, utilizing a read or read/write device 40 that is electronically coupled to a logging device 28. The read or read/write device 40 reads the test data from the logging device 28.

A processor 42 is coupled to the read or read/write device 40 via a conductive connection 46 and is utilized to manipulate or compile the test data. The recorded data is downloaded to the processor 42 after it is removed from the storage unit and, accordingly, the need for a port or opening in the storage unit to bring conductive wires into a storage unit is eliminated.

In an alternate embodiment of the present invention, the read or read/write device 40 is positioned inside of the storage unit. The read or read/write device 40 may be, for example, coupled to the storage unit, integrated within the storage unit, or coupled directly to the testing apparatus 10 without being coupled to the storage unit directly. In another exemplary embodiment of the present invention the testing apparatus 10 communicates directly with the processor 42 via a single conductive connection 46. However, because the logging devices 28 are serially networked, only a single conductive connection 46, such as a conductive wire, is required to be brought into the storage unit from a processor 42, for downloading the recorded test data from each of the logging devices 28 to the processor 42.

In an exemplary embodiment of the present invention, the display 44 is coupled to the processor 42, such that the recorded data can be viewed in real-time. The data may also be stored in the data storage device 48 for use at a later time.

Accordingly, because only one conductive connection 46 is required to be brought inside of the storage unit to connect the logging devices 28 to the processor 40, the number of conductive connections 46, such as conductive wires, entering the storage unit is reduced. Thus, the opportunity for air to enter the storage unit through the port or opening for the entry of external conductive connections is no longer variable. Accordingly, the amount of electric field generated from the incoming connection is reduced. Therefore, the amount of heat generated by the conductive connection 46 and its effect on the temperature inside of the storage unit is reduced.

In an exemplary embodiment of the present invention, a least one of the logging devices 28 is an iButton, such as the Thermacron iButton® model DS 1921 manufactured by Dallas Semiconductor of Dallas, Tex., herein incorporated by reference. The Thermacron IButton integrates a thermometer, a clock/calendar, a thermal history log and memory that stores information. The Thermacron iButton may be utilized to record temperature data at particular moments in time or during intervals of time. The stored information may be accessed directly from the Thermacron iButton, the processor 42 and/or the data storage device 48.

A write device, for example, read/write device 40, may be utilized to write information to a logging device 28, such as instructions for when to record the temperature data. In an exemplary embodiment of the present invention, the read/write device is an iButton reader, such as Blue Dot receptor, model DS/1402 by Dallas Semiconductor.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for testing environmental conditions within a storage unit, comprising:

expanding a mechanical structure having sensors mounted thereon within the storage unit;

recording environmental conditions within the storage unit using said sensors; and displaying the environmental conditions in real-time.

2. The method of claim 1, further comprising downloading the environmental conditions to a processor.

3. The method of claim 1, further comprising storing the recorded data.

* * * * *